United States Patent [19]

Gabano

[11] 4,069,374
[45] Jan. 17, 1978

[54] HIGH ENERGY DENSITY ELECTRIC CELLS

[75] Inventor: Jean-Paul Gabano, Poitiers, France

[73] Assignee: Saft-Societe des Accumulateurs Fixes et de Traction, Romainville, France

[21] Appl. No.: 769,343

[22] Filed: Feb. 16, 1977

[30] Foreign Application Priority Data

Mar. 9, 1976 France .................................. 76 06706

[51] Int. Cl.² .......................................... H01M 6/14
[52] U.S. Cl. .................................................. 429/197
[58] Field of Search ................ 429/197, 194, 219, 218

[56] References Cited

U.S. PATENT DOCUMENTS

| | | |
|---|---|---|
| 3,468,716 | 9/1969 | Eisenberg ............................ 429/197 |
| 3,681,143 | 8/1972 | Dey ....................................... 429/197 |
| 3,853,627 | 12/1974 | Lehmann et al. ................. 429/197 X |

*Primary Examiner*—C. F. Lefevour
*Attorney, Agent, or Firm*—Kenyon & Kenyon, Reilly, Carr & Chapin

[57] ABSTRACT

High energy density electric cells have lithium as the negative active material, a silver salt or a silver oxide as the positive material and a solution comprising one solute and at least two solvents as the electrolyte. According to the invention, the first solvent is chosen from the group of esters and the second is chosen from the group formed by benzene and its substituted derivatives.

9 Claims, 4 Drawing Figures

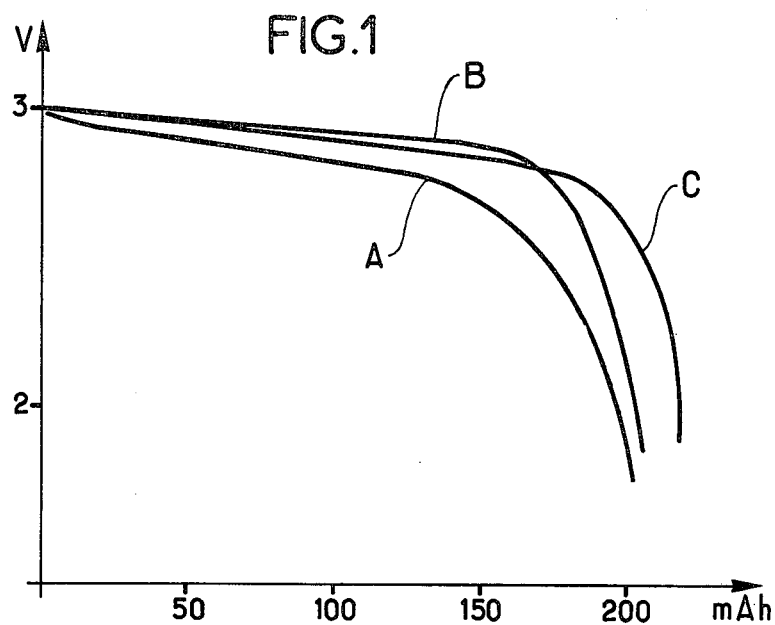
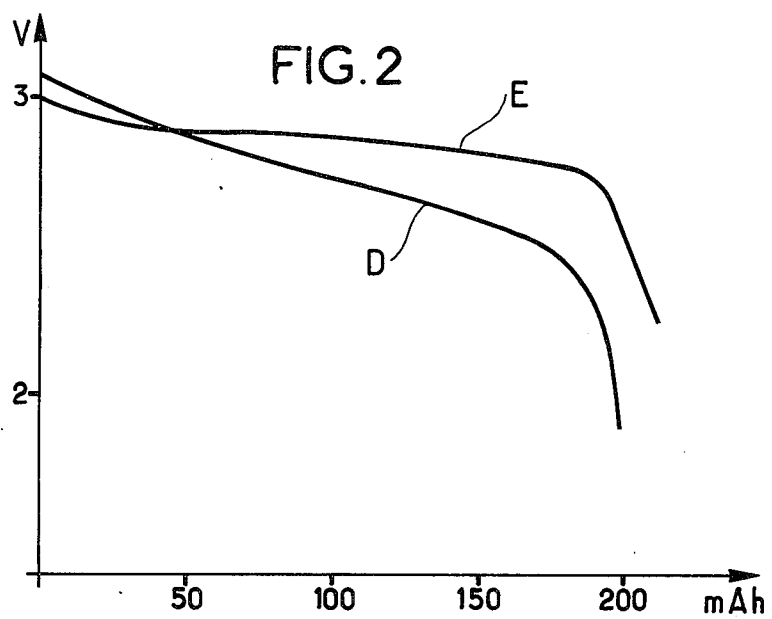

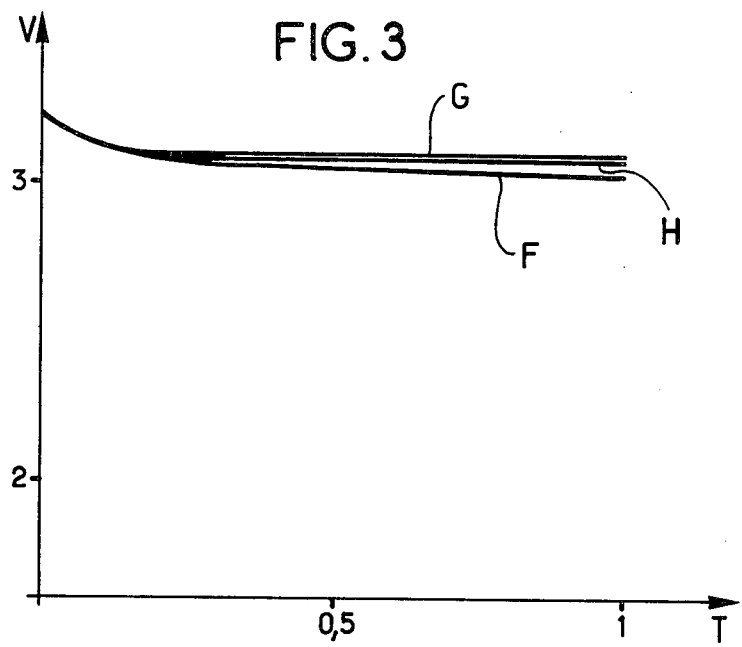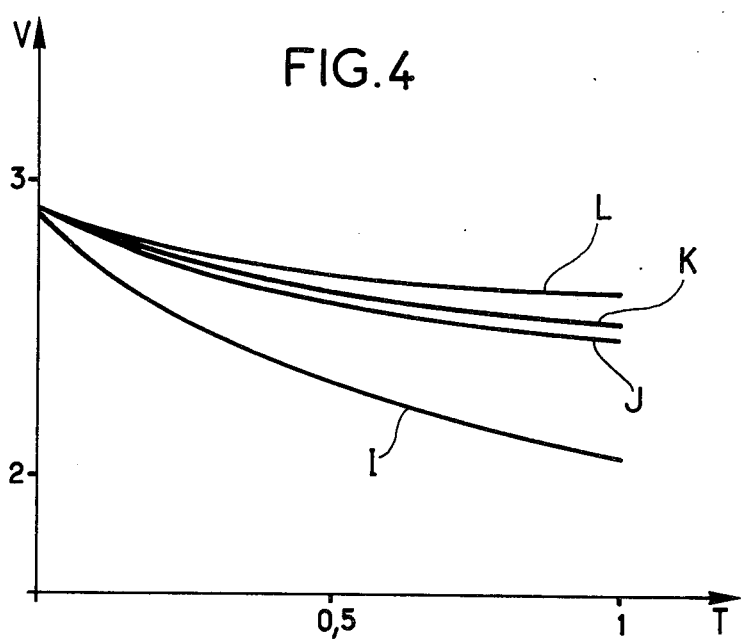

HIGH ENERGY DENSITY ELECTRIC CELLS

BACKGROUND AND BRIEF SUMMARY OF INVENTION

The present invention relates to high energy density electric cells in which the negative active material is lithium and the positive active material is a salt or an oxide of silver.

Such cells are already described, e.g., in U.S. Pat. No. 3,853,627 and in U.S. Pat. application No. 719,113.

Because of the insolubility of silver salts in electrolyte solvents (in particular in esters such as carbonates or sulphites), the positive electrode becomes polarized to some degree during the discharge which increases the impedance of the cell at the end of discharge.

Preferred embodiments of the present invention have among their objects the reduction of this drawback.

The present invention provides an electric cell having lithium as its negative active material, a silver salt or silver oxide as its positive active material and a solution comprising one solute and at least two solvents as its electrolyte the first of the solvents being chosen from a group of esters, and the second solvent of the electrolyte being an aromatic hydrocarbon.

In such a cell, the polarization of the positive electrode is much reduced and hence the discharge voltage is more constant than in a cell made according to the prior art.

Toluene and ortho-, meta- or para-xylene are among the aromatic hydrocarbon derivatives which are used with success.

According to one embodiment, the ester is a carbonate, e.g., propylene carbonate, ethylene carbonate or dimethyl carbonate and in this case the solute is advantageously lithium perchlorate.

According to another embodiment, the ester is a sulphite, e.g., dimethyl sulphite, propylene sulphite, propylene glycol sulphite, ethylene glycol sulphite and vinylene sulphite. In this case, lithium hexafluoroarsenate can advantageously be used as a solute.

The invention will be better understood from the following examples described with reference to the accompanying drawings in which:

FIG. 1 represents the discharge curves of a prior art cell as described herein and of two different cells embodying the invention.

FIG. 2 represents the discharge curves of another prior art cell as described herein and of another cell embodying the invention.

FIG. 3 represents the one hour discharge curves of a prior art cell as described herein and of five cells embodying the invention.

FIG. 4 represents the one hour discharge curves of the cells of FIG. 3, but at a higher current density.

DETAILED DESCRIPTION

1st EXAMPLE (Prior Art)

A pellet of silver ferrocyanide $Ag_4Fe(CN)_6$ was obtained by mixing silver ferrocyanide with graphite and polytetrafluoroethylene (PTFE) in the following respective proportions 71.4%, 14.3% and 14.3%. 2 grams of this mixture were compressed at a pressure of about 0.6 tons per square centimeter around a collector made of expanded silver sheet to make a positive electrode. The area of one circular surface of this electrode was about 5 $cm^2$. Two lithium washers having a diameter of 3.2 cm (i.e., about ½ cm greater than the positive electrode) and a thickness of 0.6 cm were disposed as negative electrodes on either side of the positive electrode with composite separators inserted between the electrodes. Each composite separator was composed of a rag paper layer in contact with the positive electrode and a cotton fibre felt layer in contact with the negative electrodes. The distance between the electrodes was 5 mm. The assembly was immersed in electrolyte. This electrolyte was a molar solution of lithium perchlorate in propylene carbonate. The cells were discharged at a current of 1 mA, this representing a current density of 0.1 mA/$cm^2$, since the negative electrode pellet works on both its surfaces.

Curve A in FIG. 1 shows the evolution of the voltage in volts of the cells as a function of the discharged capacity in mAh (voltage along the ordinate and discharged capacity along the abscissa).

2nd EXAMPLE

With the same disposition and the same active materials respectively as positive and negative electrodes with like dimensions, cells embodying the invention were made in which the electrolyte had a solvent constituted by a mixture of 85% of propylene carbonate and 15% of toluene (by volume). The solute was again lithium perchlorate at a concentration of 1 mole per liter. The discharge of these cells under the same conditions as in the 1st example is represented in the same diagram by a curve B. This active lies above the curve A and is less inclined towards the abscissa.

3rd EXAMPLE

Again with the same electrodes and dispositions as in the previous examples, cells embodying the invention were made analogous to the cells of the 2nd example, but in which the toluene was replaced by the same volumetric proportion of benzene. The discharge of these cells also under the same conditions, gave a curve C which starts in the same way as the curve B, then drops below it but remains substantially horizontal for a longer time.

The cells of the 2nd and 3rd examples (i.e., those embodying the present invention) are therefore superior to the prior art cells of the 1st example, both for constancy of voltage and for duration of discharge, as will be seen in FIG. 1.

4th EXAMPLE (Prior Art)

Cells were made analogous in shape to those of the 1st example and having the same electrodes. The electrolyte was a molar solution of lithium hexafluoroarseniate in dimethyl sulphite. The discharge curve of such cells under the same conditions as in the preceding examples is represented in FIG. 2 by curve D.

5th EXAMPLE

The cells of this example were cells embodying the invention analogous to the cells of the 4example, but the electrolyte solvent instead of being pure dimethyl sulphite, was a mixture of 85% dimethyl sulphite and 15% toluene (by volume). Discharge again under the same conditions, is represented in FIG. 2 by a curve E.

The advantage of the cells of the 5the example embodying the invention is also evident from FIG. 2 in which curve E is much less inclined than curve D.

In order to appreciate rapidly the effect on the polarization of the cells of the addition of the compounds according to the invention to the electrolyte, discharge tests were made on various test cells different from the abovementioned cells.

6th EXAMPLE (Prior Art)

A small quantity of a mixture of silver ferrocyanide and of graphite was compressed in a metal cap at a pressure of more than 1 ton/cm$^2$ and the resulting electrode was placed against a lithium electrode in a lithium perchlorate electrolyte dissolved in propylene carbonate at a concentration of one mole per liter. The resulting cell was discharged for one hour at a current density of 0.163 mA/cm$^2$. The variation in voltage V (volts) of this cell as a function of time T (hours) is represented in FIG. 3 by a curve F.

7th to 11th EXAMPLES

The cell was prepared with electrodes like that of the example 6, except that the electrolyte solvent was a solvent according to the invention, in which 15% (by volume) of another substance was mixed with 85% (by volume) of propylene carbonate, the other substance being respectively benzene (7), toluene (8), o-xylene (9), m-xylene (10) and p-xylene (11). The discharge curves are practically merged and represented by G and H in FIG. 3. These latter curves all lie above a curve F. (The numbers in parentheses are the example numbers).

12th EXAMPLE (Prior Art)

A cell like that of the 6th example was discharged for 1 hour at a current density of 0.814 mA/cm$^2$. (Five times the current density of the 6th to 11th examples.) The variation of the voltage as a function of time is represented in FIG. 4 by a curve I.

13th EXAMPLE

A like cell was again used but with an electrolyte solvent consisting of 85% propylene carbonate and 15% toluene, (by volume) all the rest of the cell being identical to that of the 12th example and it was treated in the same way as in the 12th example. The variation of the voltage as a function of time is represented by a curve J in FIG. 4.

14th EXAMPLE

A cell was discharged which was identical to the one in the 13th example, except that the toluene was replaced by benzene.

The current density was the same also. The corresponding curve is curve K.

15th to 17th EXAMPLES

Cells were discharged which were identical to the cell of the 13th example but in which toluene was replaced by o-xylene, m-xylene and p-xylene respectively.

The current densities were also the same. The three discharge curves are merged and represented by a curve L of FIG. 4.

These last examples, 12 et seg. show that at a higher current density than that of the 6th to 11th examples, the cells according to the invention (13th to 17th examples) give significantly better discharges than that of the 12th example which represents the prior art.

The invention is not limited to the preceding examples. Tests on silver chromate, for example, although less advantageous than the previous ones, showed that the impedance at the end of the discharge of the cells according to the invention was lower than that of prior art cells with electrolytes not containing benzene or derivatives of benzene. Variations within the scope of the appended claims, therefore, are possible and are contemplated.

What is claimed is:

1. An electric cell having lithium as its negative active material, a silver salt or silver oxide as its positive active material and a solution comprising one solute and at least two solvents as its electrolyte, the first of the solvents being selected from the group consisting of carbonate and sulphate esters, and the second solvent of the electrolyte being an aromatic hydrocarbon selected from the group, consisting of benzene and its substituted derivatives.

2. An electric cell according to claim 1, wherein said aromatic hydrocarbon is selected from the group consisting of benzene, toluene and the xylenes.

3. An electric cell according to claim 1, wherein said ester is selected from the group consisting of propylene carbonate, ethylene carbonate and dimethyl carbonate.

4. An electric cell according to claim 1, wherein the solute is lithium perchlorate.

5. An electric cell according to claim 1, wherein said ester is selected from the group consisting of dimethyl sulphite, propylene sulphite, propylene glycol sulphite, ethylene glycol sulphite and vinylene sulphite.

6. An electric cell according to claim 1, wherein the solute is lithium hexafluoroarsenate.

7. An electric cell according to claim 1, wherein the solute is selected from the group consisting of lithium perchlorate and lithium hexafluoroarsenate and wherein the first solvent is an ester selected from the group consisting of carbonates and sulphites and the second solvent is an aromatic hydrocarbon selected from the group consisting of benzene, toluene and the xylenes.

8. An electric cell according to claim 1, wherein said electrolyte is a molar solution of said solute and said solvents.

9. An electric cell accordin to claim 7, wherein said ester and said aromatic hydrocarbon are present in said solution in the respective proportions of 85% and 15%, by volume.

UNITED STATES PATENT AND TRADEMARK OFFICE
CERTIFICATE OF CORRECTION

PATENT NO. : 4,069,374
DATED : January 17, 1978
INVENTOR(S) : Jean-Paul Gabano

It is certified that error appears in the above-identified patent and that said Letters Patent are hereby corrected as shown below:

Column 1, line 44: change "exampls" to --examples--.

Column 2, line 31: change "active" to --curve--.

Column 2, line 61: change "4example" to --4th example--.

Column 2, line 66: change "5the example" to --5th example--.

Column 2, lines 53-54: change "hexafluoroarseniate" to --hexafluoroarsenate--.

Column 4, line 24: change "sulphate" to --sulphite--.

Signed and Sealed this

Sixteenth Day of May 1978

[SEAL]

Attest:

RUTH C. MASON
Attesting Officer

LUTRELLE F. PARKER
Acting Commissioner of Patents and Trademarks